United States Patent
Ittemann et al.

(10) Patent No.: US 9,249,290 B2
(45) Date of Patent: Feb. 2, 2016

(54) TERPOLYMER MOLDING COMPOUNDS WITH A LOW YELLOW INDEX, METHOD FOR PRODUCING SAME, AND USE THEREOF

(71) Applicant: STYROLUTION EUROPE GMBH, Frankfurt am Main (DE)

(72) Inventors: Peter Ittemann, Lampertheim (DE); Rolf Minkwitz, Mannheim (DE); Pascal Hesse, Mannheim (DE); Bernd Niedermaier, Ludwigshafen (DE)

(73) Assignee: STYROLUTION EUROPE GMBH (DE)

( * ) Notice: Subject to any disclaimer, the term of this patent is extended or adjusted under 35 U.S.C. 154(b) by 0 days.

(21) Appl. No.: 14/371,619

(22) PCT Filed: Dec. 28, 2012

(86) PCT No.: PCT/EP2012/077051
§ 371 (c)(1),
(2) Date: Jul. 10, 2014

(87) PCT Pub. No.: WO2013/104527
PCT Pub. Date: Jul. 18, 2013

(65) Prior Publication Data
US 2015/0011692 A1  Jan. 8, 2015

(30) Foreign Application Priority Data
Jan. 13, 2012  (EP) ..................... 12151033

(51) Int. Cl.
C08L 51/00 (2006.01)
C08L 47/00 (2006.01)
C08L 25/16 (2006.01)

(52) U.S. Cl.
CPC ............. *C08L 25/16* (2013.01); *C08L 2205/02* (2013.01); *C08L 2205/03* (2013.01)

(58) Field of Classification Search
CPC .. C08L 25/16; C08L 2205/02; C08L 2205/03
USPC ....................................... 524/504
See application file for complete search history.

(56) References Cited

U.S. PATENT DOCUMENTS 3,010,936 A * 11/1961 Irvin .............................. 525/77
3,201,375 A    8/1965  Finestone et al.
3,268,625 A    8/1966  Jones et al.

FOREIGN PATENT DOCUMENTS

| BE | 622503 | 3/1963 |
| DE | 1260135 B | 2/1968 |
| DE | 3149358 A1 | 6/1983 |
| DE | 3636191 A1 | 4/1988 |
| DE | 19728629 A1 | 1/1999 |
| DE | 19839369 A1 | 4/1999 |
| EP | 0000419 A1 | 1/1979 |
| EP | 0062901 A2 | 10/1982 |
| EP | 0264791 A2 | 4/1988 |
| EP | 0508262 A1 | 10/1992 |
| EP | 1265961 B1 | 3/2006 |
| WO | 2006/019214 A1 | 2/2006 |

OTHER PUBLICATIONS

International Search Report in Application No. PCT/EP2012/077051 dated Jul. 18, 2013.
H. Schuch et al.: "Measurement of Particle Size Distribution of Polymer Latexes," pp. 129-153, 2010.

* cited by examiner

*Primary Examiner* — Hui Chin
(74) *Attorney, Agent, or Firm* — J.A. Lindeman & Co., PLLC

(57) ABSTRACT

The invention relates to a thermoplastic molding compound containing: a) 50 to 85 parts of one or more terpolymers based on acrylnitril, alpha-methylstyrene, and styrene as component A, said terpolymers consisting of: 5 to 30 wt. % styrene, 15 to 35 wt. % acrylnitril, 50 to 70 wt. % alpha-methylstyrene, and 0 to 5 wt. % additional copolymerizable monomers, b) 15 to 50 parts of one or more impact-modifying graft rubbers with an olefinic double bond in the rubber phase as component B, c) 0 to 45 parts of one or more copolymers based on styrene and acrylnitril as component C, said copolymers consisting of: 71 to 81 wt. % styrene, 29 to 19 wt. % acrylnitril, and 0 to 5 wt. % additional copolymerizable monomers, and optionally additives and fibrous and/or particulate fillers. The thermoplastic molding compound leads to a reduced yellowing of the produced molded body.

17 Claims, 1 Drawing Sheet

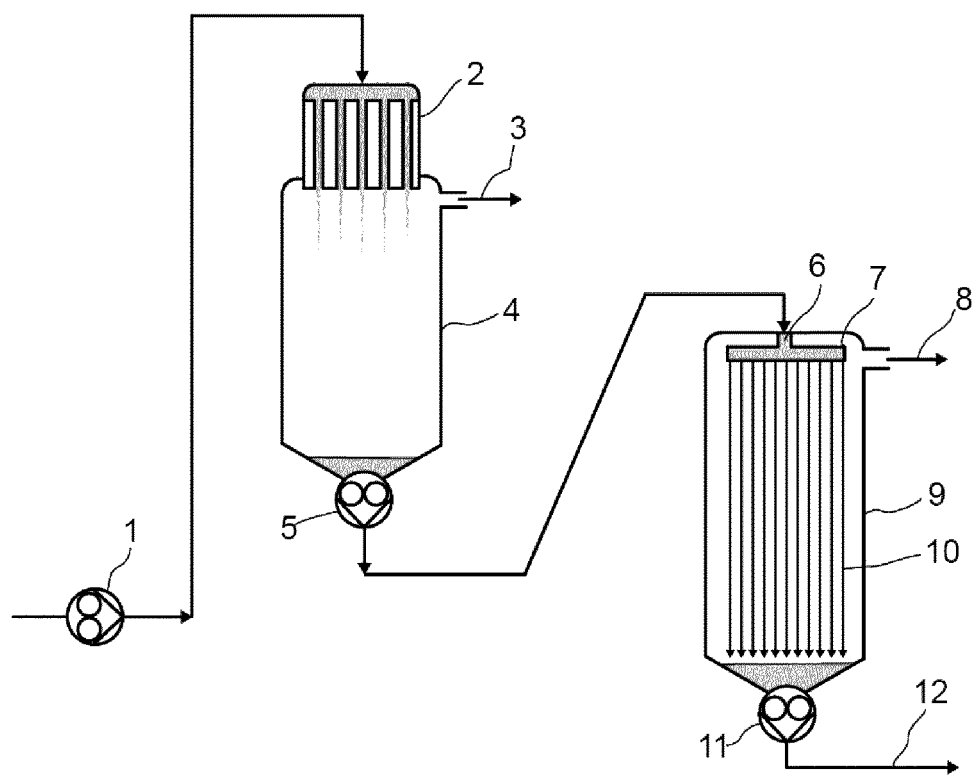

TERPOLYMER MOLDING COMPOUNDS WITH A LOW YELLOW INDEX, METHOD FOR PRODUCING SAME, AND USE THEREOF

The present invention relates to thermoplastic molding compositions comprising a terpolymer of styrene, α-methylstyrene, and acrylonitrile, and also at least one impact-modifying graft rubber having an olefinic double bond in the rubber phase. Said molding compositions have a low Yellowness Index, high gloss, and a high softening point. The invention also relates to a process for the production of the terpolymer molding compositions and to use of these.

Stabilized thermoplastic molding compositions made of styrene-acrylonitrile copolymers and graft rubber have been known for a long time and, because their property profile, in particular their good impact resistance, is advantageous for many applications they can be used for the production of a variety of moldings. Moldings made of the material ABS (polybutadiene rubber particles grafted with polystyrene-acrylonitrile in a polystyrene-acrylonitrile matrix) feature good mechanical properties, for example high strength and toughness, in particular good impact resistance that extends to low temperatures—resulting from the low glass transition temperature (Tg) of the polybutadiene.

ABS polymers, in particular those produced by emulsion polymerization, often have a distinct intrinsic color, for example from yellowish to brownish. Said intrinsic color can be expressed by way of example via the Yellowness Index (YI), which for these ABS polymers with distinct intrinsic color is from about 30 to more than 50. The Yellowness Index (YI) here depends on a plurality of factors, one of which is the rubber content of the ABS. Another possible frequent occurrence is yellowish-brownish discoloration during the production of the molding compositions and further processing thereof to give moldings, and during the use of the moldings. This yellow discoloration or brown coloring is promoted by high temperatures such as those that occur during processing by injection molding or during mixing with additional substances in an extruder.

There is often a positive correlation between the state of this discoloration and the extent of intrinsic color of the unprocessed ABS pellets before the injection molding process or before extrusion process. The intrinsic color of these polymers that are at risk of yellowing is in particular problematic because the yellow tinge can distort the desired hue (defective color reproduction) or requires the use of relatively large quantities of expensive colorant (high coloring costs).

For certain technical applications, e.g. for applications in boilers or radiant heaters, the softening point of ABS (polybutadiene rubber particles grafted with polystyrene acrylonitrile in polystyrene-acrylonitrile matrix) is also too low, this being measurable by way of example as Vicat B value.

The literature describes a number of processes for the synthesis of vinylaromatic acrylonitrile copolymers in emulsion (EP-A 508 262, EP-A 000 419, DE-A 19 839 369). The polymers described here in principle have a high Yellowness Index, and an excessively low softening point, and synthesis thereof in emulsion leads to residual monomers in the wastewater. The earlier documents U.S. Pat. No. 3,201,375 and BE 622 503 describe vinylaromatic acrylonitrile copolymers with from 5 to 35% by weight content of α-methylstyrene. These compositions have inadequate heat resistance.

U.S. Pat. No. 3,268,625 describes AMSAN copolymers (of α-methylstyrene and acrylonitrile) which can optionally also comprise styrene. The maximum content of α-methylstyrene is 52% by weight. Again, heat resistance is too low.

DE-A 36 36 191 describes copolymers with a small content of α-methylstyrene, from 30 to 45% by weight. However, the heat resistance mentioned is inadequate here.

WO 2006/019214 describes a copolymer of 5% by weight of styrene, 67% by weight of α-methylstyrene, and 28% by weight of acrylonitrile. This terpolymer has an inadequate property profile in relation to heat resistance.

BRIEF DESCRIPTION OF THE DRAWINGS

FIG. 1 illustrates a process for the production and, respectively, work-up of the molding composition.

It is an object of the present invention to provide improved molding compositions with increased heat resistance and little intrinsic color based on a copolymer of acrylonitrile, α-methylstyrene, and styrene (and possibly another monomer) grafted with rubber particles (e.g. grafted with polybutadiene rubber) and optionally a copolymer of styrene-acrylonitrile.

The present invention in particular provides heat-resistant thermoplastic molding compositions comprising the following as components, based on the total weight of the molding compositions:

a) from 50 to 85 parts of one or more terpolymers based on acrylonitrile, alpha-methylstyrene, and styrene (as component A), where the terpolymer is composed of:
   from 5 to 30% by weight, preferably from 12 to 20% by weight, often from 14 to 19% by weight, of styrene,
   from 15 to 35% by weight, preferably from 22 to 27% by weight, often from 23 to 26% by weight, of acrylonitrile,
   from 50 to 70% by weight, preferably from 57 to 62% by weight often from 58 to 60% by weight, of alpha-methylstyrene,
   from 0 to 5% by weight, preferably from 0 to 3% by weight, of other copolymerizable monomers, b) from 15 to 50 parts of one or more impact-modifying graft rubbers having an olefinic double bond in the rubber phase, as component B, c) from 0 to 45 parts of one or more copolymers based on styrene and acrylonitrile as component C consisting of
   from 71 to 81% by weight, preferably from 73 to 79% by weight, often from 75 to 77% by weight, of styrene,
   from 29 to 19% by weight, preferably from 27 to 21% by weight, often from 25 to 23% by weight, of acrylonitrile,
   from 0 to 5% by weight, preferably from 0 to 4% by weight, often from 0 to 3% by weight, of other copolymerizable monomers, d) from 0 to 30 parts of one or more additional substances differing from components A, B, and C, as component D, and e) from 0 to 100 parts of one or more fibrous or particulate fillers as component E.

The thermoplastic composition often consists of the above-mentioned components A, B, and also optionally C to E. The parts data are based on parts by weight.

The terpolymer of acrylonitrile, alpha-methylstyrene, and styrene (component A) here is preferably intended to have the following properties:
   Vicat B softening point above 120° C.,
   Yellowness Index below 20 (e.g. from 10 to 19), and
   viscosity number from 40 to 60.

The terpolymer of acrylonitrile, alpha-methylstyrene, and styrene (component A) can be obtained via a non-aggressive production process in such a way that the total residual content of monomers is less than 3000 ppm. Advantageous residual contents are in particular less than 200 ppm, in particular less than 150 ppm, of styrene, less than 200 ppm, in particular less than 50 ppm, of ethylbenzene, less than 200 ppm, in particular less than 150 ppm, of acrylonitrile, and less than 2000 ppm, in particular less than 1500 ppm, of alpha-methylstyrene.

The terpolymer of acrylonitrile, alpha-methylstyrene, and styrene (component A) can be obtained via a non-aggressive production process in such a way that the total residual content of oligomers is less than 5000 ppm. Advantageous residual contents are in particular less than 3500 ppm of dimers and trimers (of the monomers used).

The copolymer of styrene and acrylonitrile (component C) here is preferably intended to have the following properties:
Vicat B softening point above 100° C.,
Yellowness Index below 20 (e.g. from 10 to 19).

One embodiment of the invention provides a thermoplastic molding composition comprising:
a) from 50 to 85 parts of a terpolymer based on acrylonitrile, alpha-methylstyrene, and styrene (as component A) consisting of:
  from 12 to 20% by weight of styrene,
  from 22 to 27% by weight of acrylonitrile,
  from 57 to 62% by weight of alpha-methylstyrene,
  from 0 to 3% by weight of other copolymerizable monomers,
b) from 15 to 50 parts of one or more impact-modifying graft rubbers having an olefinic double bond in the rubber phase, as component B,
c) from 0 to 30 parts of one or more copolymers based on styrene and acrylonitrile, as component C, consisting of
  from 71 to 81% by weight of styrene,
  from 29 to 19% by weight of acrylonitrile,
  from 0 to 5% by weight of other copolymerizable monomers,
d) from 0 to 30 parts of one or more additional substances differing from components A, B, C, as component D, and
e) from 0 to 100 parts of fibrous and/or particulate fillers as component E.

One embodiment of the invention provides a thermoplastic molding composition comprising:
a) from 50 to 85 parts of a terpolymer based on acrylonitrile, alpha-methylstyrene and styrene (as component A) consisting of:
  from 12 to 20% by weight of styrene,
  from 22 to 27% by weight of acrylonitrile,
  from 57 to 62% by weight of alpha-methylstyrene,
b) from 15 to 50 parts of one or more impact-modifying graft rubbers having an olefin double bond in the rubber phase, as component B,
c) from 0 to 30 parts of a copolymer based on styrene and acrylonitrile, as component C, consisting of
  from 71 to 81% by weight of styrene,
  from 29 to 19% by weight of acrylonitrile,
d) from 0 to 10 parts of one or more additional substances differing from components A, B, C, as component D, and
e) from 0 to 40 parts of fibrous and/or particulate fillers as component E.

One embodiment of the invention provides a thermoplastic molding composition comprising from 50 to 85 parts of a terpolymer based on acrylonitrile, alpha-methylstyrene, and styrene (as component A), where the total residual content of monomers in the terpolymer is less than 3000 ppm.

The invention also provides a thermoplastic molding composition comprising from 50 to 85 parts of a terpolymer based on acrylonitrile, alpha-methylstyrene, and styrene (as component A), where the residual contents of monomers in the terpolymer are less than 200 ppm of styrene, less than 200 ppm of ethylbenzene, less than 200 ppm of acrylonitrile, and less than 2000 ppm of alpha-methylstyrene.

One embodiment of the invention provides a thermoplastic molding composition comprising from 50 to 85 parts of a terpolymer based on acrylonitrile, alpha-methylstyrene, and styrene (as component A), which has the following properties:
Vicat B softening point above 120° C.,
Yellowness Index below 20, and
viscosity number from 40 to 60.

One embodiment of the invention provides a thermoplastic molding composition characterized in that component B is an impact-modifying graft rubber which consists of a graft B1 made of from 50 to 80% by weight (based on B) of an elastomer-crosslinked butadiene polymer B1, and also of a graft B2 consisting of:
from 25 to 15% by weight, preferably from 24 to 16% by weight, with particular preference of from 23 to 17% by weight, of acrylonitrile and
from 75 to 85% by weight, preferably from 76 to 84% by weight, with particular preference of from 77 to 83% by weight, of styrene and/or alpha-methylstyrene.

One embodiment of the invention provides a thermoplastic molding composition characterized in that the average particle diameter of component B is from 50 to 800 nm.

One embodiment of the invention provides a thermoplastic molding composition characterized in that the swelling index of component B is from 7 to 20.

One embodiment of the invention provides a thermoplastic molding composition characterized in that a component B with a bimodal particle size distribution is used.

One embodiment of the invention provides a thermoplastic molding composition characterized in that component C used comprises from 1 to 30 parts of a copolymer based on styrene and acrylonitrile, consisting of from 75 to 77% by weight of styrene and from 25 to 23% by weight of acrylonitrile.

A process is also provided for the production of a thermoplastic molding composition as described above characterized in that components A and B, and also optionally C to E, are mixed with one another in any desired sequence at temperatures of from 100 to 300° C. and at a pressure of from 1 to 50 bar, and then are kneaded and extruded.

A process is also provided for the production of a terpolymer based on acrylonitrile, alpha-methylstyrene, and styrene (component A) consisting of from 5 to 30% by weight of styrene, from 15 to 35% by weight of acrylonitrile, from 50 to 70% by weight of alpha-methylstyrene, and also from 0 to 5% by weight of other copolymerizable monomers, characterized in that the monomers are reacted in a free-radical solution polymerization reaction at temperatures of from 100 to 140° C. and then the residual monomer content is reduced to less than 3000 ppm in a tube-bundle reactor at a pressure of less than 50 mbar.

The use is also provided of thermoplastic molding compositions as described above for the production of moldings, foils, or fibers, as also is the use of the thermoplastic molding compositions for the production of the moldings for motor-vehicle components or parts of electronic equipment.

The invention also provides the moldings, fibers, or foils made of a thermoplastic molding composition as described above.

The molding compositions of the invention preferably comprise, based on the total weight (mass) of components A, B (necessary components) and optionally C, D, and E (optional components), which total weight gives 100 percent by weight:

a) from 50 to 85 parts, preferably from 60 to 80, parts of component A,
b) from 15 to 50 parts, preferably from 20 to 40 parts, of component B,
c) from 0 to 45 parts, preferably from 0 to 40, or from 0 to 30, often from 1 to 20, parts of component C,
d) from 0 to 30 parts, preferably from 0 to 10, often from 1 to 10, parts of component D,
e) from 0 to 100 parts, preferably from 0 to 40 parts, often from 1 to 20, of component E.

For components A, B, and C it is also possible to state percent by weight (based on the entirety of components A, B, and C) instead of parts; by way of example, the molding composition comprises:

a) from 50 to 85, preferably from 60 to 80% by weight, often from 60 to 79% by weight, of component A,
b) from 15 to 50, preferably from 20 to 40% by weight, often from 20 to 39% by weight, of component B,
c) from 0 to 40, or from 0 to 30, often from 1 to 20% by weight of component C.

One embodiment of the invention provides a thermoplastic molding composition consisting of:

a) from 50 to 85 parts of one or more terpolymers based on acrylonitrile, alpha-methylstyrene, and styrene (as component A) consisting of:
  from 5 to 30% by weight of styrene,
  from 15 to 35% by weight of acrylonitrile,
  from 50 to 70% by weight of alpha-methylstyrene,
  from 0 to 5% by weight of other copolymerizable monomers,
b) from 15 to 50 parts of one or more impact-modifying graft rubbers having an olefinic double bond in the rubber phase, as component B,
c) from 0 to 45 parts of one or more copolymers based on styrene and acrylonitrile, as component C consisting of:
  from 71 to 81% by weight of styrene,
  from 29 to 19% by weight of acrylonitrile,
  from 0 to 5% by weight of other copolymerizable monomers,
d) from 0 to 30 parts of one or more additional substances as component D, and
e) from 0 to 100 parts of one or more fibrous and/or particulate fillers as component E.

Another embodiment of the invention provides a thermoplastic molding composition comprising (or consisting of):

a) from 50 to 85 parts of a terpolymer based on acrylonitrile, alpha-methylstyrene, and styrene (as component A) consisting of:
  from 12 to 20% by weight of styrene,
  from 22 to 27% by weight of acrylonitrile,
  from 57 to 62% by weight of alpha-methylstyrene,
  from 0 to 3% by weight of other copolymerizable monomers,
b) from 15 to 50 parts of one or more impact-modifying graft rubbers having an olefinic double bond in the rubber phase, as component B,
c) from 0 to 30 parts of one or more copolymers based on styrene and acrylonitrile, as component C, consisting of
  from 71 to 81% by weight of styrene,
  from 29 to 19% by weight of acrylonitrile,
  from 0 to 5% by weight of other copolymerizable monomers,
d) from 0 to 30 parts of one or more additional substances differing from components A, B, C, as component D, and
e) from 0 to 100 parts of fibrous and/or particulate fillers as component E.

One embodiment of the invention provides a thermoplastic molding composition comprising (or consisting of):

a) from 50 to 85 parts of a terpolymer based on acrylonitrile, alpha-methylstyrene and styrene (as component A) consisting of:
  from 12 to 20% by weight of styrene,
  from 22 to 27% by weight of acrylonitrile,
  from 57 to 62% by weight of alpha-methylstyrene,
b) from 15 to 50 parts of one or more impact-modifying graft rubbers having an olefinic double bond in the rubber phase, as component B,
c) from 0 to 30 parts of a copolymer based on styrene and acrylonitrile, as component C, consisting of
  from 71 to 81% by weight of styrene,
  from 29 to 19% by weight of acrylonitrile,
d) from 0 to 10 parts of one or more additional substances differing from components A, B, C, as component D, and
e) from 0 to 40 parts of fibrous and/or particulate fillers as component E.

One embodiment of the invention provides a thermoplastic molding composition comprising from 50 to 85 parts of a terpolymer based on acrylonitrile, alpha-methylstyrene, and styrene (as component A), where the total residual content of monomers in the terpolymer is less than 3000 ppm.

One embodiment of the invention provides a thermoplastic molding composition comprising from 50 to 85 parts of a terpolymer based on acrylonitrile, alpha-methylstyrene, and styrene (as component A), where the residual contents of monomers in the terpolymer are less than 200 ppm of styrene, less than 200 ppm of ethylbenzene, less than 200 ppm of acrylonitrile, and less than 2000 ppm of alpha-methylstyrene.

One embodiment of the invention provides a thermoplastic molding composition comprising from 50 to 85 parts of a terpolymer based on acrylonitrile, alpha-methylstyrene, and styrene (as component A), which has the following properties:
  Vicat B softening point above 120° C.,
  Yellowness Index below 20, and
  viscosity number from 40 to 60.

One embodiment of the invention provides a thermoplastic molding composition where component B is an impact-modifying graft rubber which consists of a graft B1 made of from 50 to 80% by weight (based on B) of an elastomer-crosslinked butadiene polymer B1, and also of a graft B2 consisting of:
  from 25 to 15% by weight, preferably from 24 to 16% by weight, with particular preference of from 23 to 17% by weight, of acrylonitrile and
  from 75 to 25% by weight, preferably from 76 to 24% by weight, with particular preference of from 77 to 83% by weight, of styrene and/or alpha-methylstyrene.

One embodiment of the invention provides a thermoplastic molding composition where the average particle diameter of component B is from 50 to 800 nm. The swelling index of component B is often from 7 to 20. A component B with a bimodal particle size distribution is often used.

One embodiment of the invention provides a thermoplastic molding composition where component C used comprises from 1 to 30 parts of a copolymer based on styrene and acrylonitrile, consisting of from 75 to 77% by weight of styrene and from 25 to 23% by weight of acrylonitrile.

The invention also provides a process for the production of thermoplastic molding compositions, as described above, characterized in that components A and B, and also optionally C to E, are mixed with one another in any desired sequence at temperatures of from 100 to 300° C. and at a pressure of from 1 to 50 bar, and then are kneaded and extruded.

One embodiment of the invention provides the use of thermoplastic molding compositions as described above for the production of moldings, foils, or fibers. The use of the thermoplastic molding compositions for the production of moldings for motor-vehicle components or parts of electronic equipment is of particular interest here.

One embodiment of the invention also provides the moldings, fibers, or foils made of a thermoplastic molding composition as described above.

The invention also provides processes for the production of component A of these molding compositions, the use of component A for the production of moldings, and also these moldings themselves.

By virtue of the specific selection, essential to the invention, of the individual components, and of the specific quantitative proportions of these, the molding compositions of the invention have, in comparison with the known stabilized molding compositions, reduced intrinsic color and increased heat resistance.

Re Component A and Production Thereof:

The thermoplastic molding compositions of the invention comprise, as component A, at least one terpolymer of acrylonitrile, alpha-methylstyrene, styrene (and possibly another vinyl monomer) which is preferably characterized by a Vicat B softening point above 120° C. and a Yellowness Index below 20.

The molar mass (Mw) is often from 70 000 to 100 000 g/mol, and the value Mn is often from 26 000 to 33 000 g/mol.

The Vicat softening point was determined on standard small specimens in accordance with the standard DIN ISO 306, with a force of 50 N and a temperature rise of 50 K per hour. The polymer pellets have to be dry for the production of standard small specimens of thickness 3 mm and area 10 mm×10 mm, and each measurement here always used at least two test samples, the stated value being the average for these.

The Yellowness Index (YI) was determined via determination of the color coordinates X, Y, Z in accordance with DIN 6167 using standard D 65 light and standard 10° observer.

Preferred components A have the following structure:
from 12 to 20% by weight, preferably from 14 to 19% by weight, of styrene and
from 22 to 27% by weight, preferably from 23 to 26% by weight of acrylonitrile, and
from 57 to 62% by weight, preferably from 58 to 60% by weight, of alpha-methylstyrene.

They can also optionally comprise from 0 to 5% by weight, preferably from 0 to 3% by weight, of other monomers, where each of the % by weight values is based on the weight of component A and these values give a total of 100% by weight.

Abovementioned other monomers that can be used are any of the copolymerizable monomers, for example p-methylstyrene, t-butylstyrene, vinylnaphthalene, alkyl acrylates, and/or alkyl methacrylates, for example those having $C_1$- to $C_8$-alkyl moieties, N-phenylmaleimide, or a mixture of these. However, there are often no other monomers comprised, and then the material is a genuine terpolymer.

The viscosity number VN of the terpolymer is less than or equal to 60 ml/g. The viscosity number (VN) is measured here in accordance with DIN EN ISO 1628-2 at 25° C., on a 0.5% by weight solution in dimethylformamide; this measurement method also applies to all of the viscosity numbers mentioned hereinafter.

Component A here is produced in a free-radical solution polymerization reaction or free-radical bulk polymerization reaction, with or without help of initiators at temperatures below 140° C. up to a concentration of from 50 to 70%. A particular solvent used is ethylbenzene, toluene, or methyl ethyl ketone.

Particular importance is attached to the production and work-up of component A with the aim of achieving low monomer content and, respectively, low oligomer content. Various production processes can be used.

The invention therefore also provides a process for the production of a terpolymer based on acrylonitrile, alpha-methylstyrene, and styrene (component A) consisting of from 5 to 30% by weight of styrene, from 15 to 35% by weight of acrylonitrile, from 50 to 70% by weight of alpha-methylstyrene, and also from 0 to 5% by weight of other copolymerizable monomers, characterized in that the monomers are reacted in a free-radical solution polymerization reaction at temperatures of from 100 to 140° C. and then the residual monomer content is reduced to less than 3000 ppm in a tube-bundle reactor at a pressure of less than 50 mbar. FIG. 1 illustrates a process for the production and, respectively, work-up of the molding composition.

As can be seen from FIG. 1, the polymer solution with component A can, after the production process, be introduced by way of a gear pump 1 from above into a vertical tube-bundle apparatus.

Below the tube bundle 2 therein, there is preferably a separator or cyclone 4 in which the gas phase arising in the tubes is separated from the polymer phase. In order to isolate the polymer with very low monomer contents (preferably below 4000 ppm, often below 2000 ppm) it is advisable to lower the pressure in the cyclone 4 to from 50 to 100 mbar, preferably below 50 mbar.

The substantially "demonomerized" polymer phase accumulates at the bottom of the separator 4. The gases are preferably drawn off laterally or by way of an overhead line 3, and returned to the polymerization reaction.

In order to achieve non-aggressive concentration via introduction of energy with simultaneous evaporation, it is preferable to use heating media in the form of liquids or vapors to heat the tube-bundle evaporator. The heating method is such that the temperature in the outlet is from 165° C. to 280° C., preferably from 210° C. to 250° C. The temperatures of the jacket heating system are from 190° C. to 240° C., preferably from 220° C. to 230° C.

A particular feature of the process of the invention is that there are no plates or constrictions provided within the tubes, i.e. the pressure loss experienced by the flow in the tubes is small. It is preferably less than 10 mbar, with preference less than 5 mbar, depending on heating temperature, viscosity of polymer, throughput, and tube geometry.

By virtue of the low pressure in the tube, concentration of the solution by evaporation begins, given an adequately high heating temperature, before the product leaves the tubes, preferably shortly after entry of the solution into the tubes. The onset of evaporation produces a voluminous foam, and the residence time in the tubes is thus greatly reduced in comparison with single-phase flow.

Surprisingly, this two-phase system improves the heat transfer in comparison with a single-phase system, and it is thus possible to achieve good results in the concentration-by-evaporation process with low heating temperatures.

The onset of evaporative cooling during the evaporation process avoids overheating of the product, in contrast to the "flash evaporation" process. The two-phase system within the tubes, with its advantageous effect on heat transfer, residence time, and product temperature (evaporative cooling) ensures that the concentration-by-evaporation process is non-aggressive, i.e. involves little thermal stress and short residence times.

The throughput per tube in the tube bundle 2 is often from 1 to 10 kg/h, preferably from 2 to 5 kg/h. The tube length is preferably from 1 to 2.5 m, and the tube diameter is preferably from 8 to 23 mm. There can also be static mixers provided in the tubes in order to improve heat transfer. The mixers have the advantage that mixing takes place within the tubes and overheating of regions (layers) close to walls is thus avoided.

In order to achieve uniform distribution of the stream entering the tube bundle 2, across the individual tubes in the tube-bundle apparatus described, it is optionally possible to install a distributor plate (perforated plate) above the tube entry; said plate increases the pressure loss in the space before the tubes.

The residual content of monomers in the product is often already from 1000 to 2000 ppm after passage through the tube-bundle evaporator. The product isolated with these residual contents is collected at the bottom of the separator 4, and discharged by a gear pump or screw pump 5 from the separator, and conveyed to the strand evaporator that follows.

In this, in one particular type of embodiment, the product is distributed from a central tube 6 by way of a tube distributor 7 to a large number of individual tubes which have a conical or cylindrical shape. In the case of the cylindrical shape, the diameter (dz) is from 2 to 6 mm, preferably from 3 to 5 mm, and the length is from 40 to 80 mm, preferably from 50 to 70 mm.

In order to ensure uniform distribution of the solution across the tubes, these are heated. Below the tube distributor 7 is the upper end of a vertical jacket-heated container 9 with a preferred height of from 2 to 10 m, preferably from 2 to 4 m, evacuated to an absolute pressure of from 0.5 to 10, preferably from 0.5 to 2 mbar by way of a vapor take-off system. Between the base of the container and the holes of the tube distributor, the thin, stable polymer filaments 10 are formed. The polymer is devolatilized as it proceeds towards the container base with an average residence time of less than 15 seconds.

Output per hole, with diameter from 2 to 6 mm, preferably from 3 to 5 mm, is preferably from 0.2 to 0.4 kg/h of product. The product accumulates in the preferably conical lower part of the container 9, and is conveyed by a gear pump or screw pump 11 to a pelletizer or to further processing in the form of melt 12.

The total content of monomers in the terpolymer of acrylonitrile, alpha-methylstyrene, and styrene (component A) after said devolatilization step is less than 2000 ppm. It is possible to achieve residual contents of less than 200 ppm, in particular less than 150 ppm, of styrene, less than 200 ppm, in particular less than 50 ppm, of ethylbenzene, less than 200 ppm, in particular less than 150 ppm, of acrylonitrile, and less than 2000 ppm, in particular less than 1500 ppm, of alpha-methylstyrene.

One method of characterizing component A is determination of the α-methylstyrene/styrene triades (S-S-S) and of the α-methylstyrene/styrene diades (S-S) with the aid of $^{13}$C NMR spectroscopy. For this, the copolymer is subjected to measurement in deuterated chloroform with tetramethylsilane as internal standard. In the signal region from 140 to 150 ppm, the α-methylstyrene/styrene diade (S-S) group is apparent at from 141 to 144 ppm, and the α-methylstyrene/styrene triade group (S-S-S) is apparent at from 147.5 to 150 ppm.

The content of the respective group is determined by using the integral over all of the signals, as described in EP-A 1 265 961. It is often difficult to distinguish between the signals of α-methylstyrene and styrene.

Re Component B:

Component B used comprises one or more elastomeric graft copolymers of vinylaromatic compounds, in particular styrene, and of vinyl cyanides, in particular acrylonitrile, on polybutadiene rubbers.

One method of characterizing the state of crosslinking of crosslinked polymer particles is measurement of the swelling index (SI), which is a measure of the swellability, by a solvent, of a polymer which may have various degrees of crosslinking. A usual swelling agent is by way of example methyl ethyl ketone or toluene. The SI of the graft copolymer B of the molding compositions of the invention is usually in the range from 7 to 20. Preference is given to SI of 8 to 15, particularly from 8 to 13 in toluene.

The swelling index is determined by drying an aqueous dispersion of the graft copolymer B overnight on a metal sheet at 80° C. under slight vacuum (from 600 to 800 mbar) in nitrogen. A sheet measuring 1 cm$^2$ is then cut out of the remaining film of thickness about 2 mm, and is swollen in 50 ml of toluene (or methyl ethyl ketone) overnight in a penicillin bottle. The supernatant toluene is removed by suction, and the swollen film is weighed, and dried overnight at 80° C. The weight of the dried film is determined. The swelling index is the quotient calculated from the weights of the swollen gel and the dried gel.

Component B preferably consists of one or more impact-modifying graft rubbers having an olefinic double bond in the rubber phase. The structure of the graft polymer B has a "soft" elastomeric, particulate "graft base" B1 and a "hard graft" B2.

The material comprises a proportion of from 40 to 90, preferably from 45 to 85 and particularly preferably from 50 to 80% by weight, based on component B, of the graft base B1.

The graft base B1 is obtained via polymerization of, based on B1, from 70 to 100, preferably from 75 to 100 and particularly preferably from 80 to 100% by weight, at least one conjugated diene B11 and from 0 to 30, preferably from 0 to 25 and particularly preferably from 0 to 10% by weight of at least one other monoethylenically unsaturated monomer. Conjugated dienes B11 that can be used are butadiene, isoprene, chloroprene, or a mixture of these. It is preferable to use butadiene or isoprene or a mixture of these, and it is very particularly preferable to use butadiene.

Constituent B1 of the molding compositions can moreover comprise, with concomitant reduction in the quantity of the monomers B11, other monomers B12 which vary the mechanical and thermal properties of the core within a certain range. Examples that may be mentioned of monoethylenically unsaturated comonomers of this type are: styrene, alpha-methylstyrene, acrylonitrile, maleic anhydride, acrylic acid, methylacrylic acid, maleic acid, and fumaric acid.

It is preferable to use styrene, α-methylstyrene, n-butyl acrylate, or a mixture of these as monomers B12, particularly styrene and n-butyl acrylate, or a mixture of these, and very particularly styrene. In particular, styrene or n-butyl acrylate or a mixture of these is used in quantities totaling up to 20% by weight, based on B1.

One particular embodiment uses a graft base made of, based on B1:

B11 from 70 to 99.9, preferably from 90 to 99% by weight of butadiene, and

B12 from 0.1 to 30, preferably from 1 to 10% by weight of styrene.

The material comprises a proportion of from 10 to 60, preferably from 15 to 55 and particularly preferably form 20 to 50% by weight, based on component B, of the graft B2.

The graft B2 is obtained via polymerization of, based on B2:

B21 from 65 to 95, preferably from 70 to 90 and particularly preferably from 72 to 85% by weight of at least one vinylaromatic monomer, B22 from 5 to 35, preferably from 10 to 30 and particularly preferably from 15 to 28% by weight of acrylonitrile, B23 from 0 to 30, preferably from 0 to 20 and particularly preferably from 0 to 15% by weight of at least one other monoethylenically unsaturated monomer.

Vinylaromatic monomers used can be styrene and/or alpha-methylstyrene. Other monomers B23 that can be used are the monomers mentioned at an earlier stage above for component B12. In particular, methyl methacrylate and acrylates such as n-butyl acrylate are suitable. Methyl methacrylate MMA is very particularly suitable as monomer B23, and preference is given to a quantity of up to 20% by weight of MMA, based on B2.

The graft polymers are often produced by the emulsion polymerization process. The usual polymerization temperature is from 20 to 100° C., preferably from 30 to 90° C. Concomitant use is generally made of conventional emulsifiers for example alkali metal salts of alkyl- or alkylarylsulfonic acids, alkyl sulfates, fatty alcohol sulfonates, salts of higher fatty acids having from 10 to 30 carbon atoms, sulfosuccinates, ether sulfonates, or resin soaps. It is preferable to select the alkali metal salts, in particular the Na and K salts, of alkylsulfonates or fatty acids having from 10 to 18 carbon atoms.

Quantities generally used of the emulsifiers are from 0.5 to 5% by weight, in particular from 0.5 to 3% by weight, based on the monomers used in the production of the graft base B1. It is preferable to produce the dispersion with use of sufficient water to provide a solids content of from 20 to 50% by weight in the finished dispersion. Operations are usually carried out with a water/monomer ratio of from 2:1 to 0.7:1.

Free-radical generators suitable for initiating the polymerization reaction are any of those that decompose at the selected reaction temperature, i.e. not only those which decompose solely purely thermally but also those which decompose in the presence of a redox system. Polymerization initiators that can be used are preferably free-radical generators such as peroxides, with preference by way of example peroxosulfates (for example, sodium persulfate or potassium persulfate) and azo compounds such as azodiisobutyronitrile. However, it is also possible to use redox systems, in particular those based on hydroperoxides such as cumene hydroperoxide.

The quantity generally used in the polymerization initiators is from 0.1 to 1% by weight, based on the graft-base monomers B11 and B12.

The free-radical generators, and also the emulsifiers, are by way of example added batchwise all at once at the beginning of the reaction, or to some extent at the beginning and to some extent at one or more subsequent junctures, after division into a number of portions, or continuously during a certain period of time. The continuous addition can also follow a gradient which can by way of example be rising or falling, linear or exponential, or else staged (step function).

Molecular weight regulators can moreover be used concomitantly, examples being ethylhexyl thioglycolate, n- or tert-dodecyl mercaptan, or other mercaptans, terpinols, and dimeric α-methylstyrene, or other compounds suitable for molecular weight regulation. The molecular weight regulators are added batchwise or continuously to the reaction mixture, in the way previously described for the free-radical generators and emulsifiers.

In order to maintain a constant pH, which is preferably from 6 to 9, buffer substances may be used concomitantly, an example being $Na_2HPO_4/NaH_2PO_4$, sodium hydrogencarbonate, or buffer based on citric acid/citrate. The quantities used of regulators and buffer substances are conventional, and there is therefore no need for further details in that connection.

In one particular preferred embodiment, a reducing agent is added during the grafting of the graft base B1 with the monomers B21 to B23.

In one particular embodiment it is also possible to produce the graft base via polymerization of the monomers B1 in the presence of a fine-particle latex ("seed latex procedure" for the polymerization reaction). Said latex is used as initial charge, and can consist of monomers that form elastomeric polymers, or else of the other monomers already mentioned. Suitable seed latices consist by way of example of polybutadiene or polystyrene.

In another preferred embodiment, the graft base B1 can be produced by what is known as the feed process. In this process, a certain proportion of the monomers B1 is used as initial charge and the polymerization reaction is initiated, and then the remainder of the monomers ("feed portion") B1 is added as feed during the polymerization reaction.

The feed parameters (shape of gradient, quantity, duration, etc.) depend on the other polymerization conditions. In principle, the statements made in relation to the manner of addition of the free-radical initiator and, respectively, emulsifier are also valid here. In the feed process it is preferable that the proportion of the monomers used as initial charge is from 5 to 50, particularly preferably from 8 to 40% by weight based on B1. It is preferable that the feed time allowed for the feed portion of B1 is from 1 to 18 hours, in particular from 2 to 16 hours, very particularly from 4 to 12 hours.

Graft polymers having a plurality of "soft" and "hard" shells are moreover also suitable, an example of the structure being B1-B2-B1-B2 or B2-B1-B2, especially in the case of relatively large particles.

The precise polymerization conditions, in particular nature, quantity, and metering of the emulsifier and of the other polymerization aids, are preferably selected in such a way that the resultant latex of the graft polymer B has a median particle size, defined via the $d_{50}$ value of the particle size distribution, of from 80 to 800 nm, preferably from 80 to 600 nm, and particularly preferably from 85 to 400 nm, measured with the aid of HDC (W. Wohlleben and H. Schuch in *Measurement of Particle Size Distribution of Polymer Latexes,* 2010, editors: Luis M. Gugliotta and Jorge R. Vega, pp. 130-153).

It is preferable to balance the reaction conditions with respect to one another in such a way that the polymer particles of B have a bimodal particle size distribution, i.e. a size distribution with two relatively distinct maxima. The first maximum is more distinct (comparatively narrower peak) than the second, and is generally at from 25 to 200, preferably from 60 to 170, particularly preferably from 70 to 150 nm.

The second maximum is generally at from 150 to 800, preferably from 180 to 700, particularly preferably from 200 to 600 nm. The second maximum (from 150 to 800 nm) here is at larger particle sizes than the first maximum (from 25 to 200 nm).

The bimodal particle size distribution is preferably achieved via (partial) agglomeration of the polymer particles. The procedure for this can by way of example be as follows: the monomers B1 which form the core are polymerized to a conversion of usually at least 90, preferably more than 95%, based on the monomers used. This conversion is generally reached after from 4 to 20 hours. The median particle size $d_{50}$ of the resultant rubber latex is at most 200 nm, and it has a narrow particle size distribution (almost monodisperse system).

In the second stage, the rubber latex is agglomerated. This is generally achieved via addition of a dispersion of an acrylate polymer. It is preferable to use dispersions of copolymers of ($C_1$-$C_4$-alkyl) esters of acrylic acid, preferably of ethyl acrylate, with from 0.1 to 10% by weight of monomers that form polar polymers, e.g. acrylic acid, methacrylic acid, acrylamide, or methacrylamide, N-methylolmethacrylamide, or N-vinylpyrrolidone.

Preference is given to a composition made of from 80 to 98% of ethyl acrylate and from 2 to 20% of methacrylamide, and particular preference is given to a composition made of from 90 to 98% of ethyl acrylate and from 2 to 10% of methacrylamide. The agglomeration dispersion can optionally also comprise a plurality of the acrylate polymers mentioned.

The concentration of the acrylate polymers in the dispersion used for the agglomeration process is generally to be from 3 to 40% by weight. The quantity of the agglomeration dispersion used in the agglomeration process for every 100 parts of the rubber latex, in each case calculated on solids, is from 0.2 to 20, preferably from 1 to 5 parts by weight. The agglomeration process is carried out via addition of the agglomeration dispersion to the rubber. The addition rate is normally not critical, and the process generally takes about 1 to 30 minutes at a temperature of from 20 to 90° C., preferably from 30 to 75° C.

Materials other than acrylate polymer dispersion that can be used to agglomerate the rubber latex are other agglomeration agents, for example acetic anhydride. Another possibility is agglomeration via pressure or freezing (pressure agglomeration or freeze agglomeration). The methods mentioned are known to the person skilled in the art.

Only a portion of the rubber particles is agglomerated under the conditions mentioned, and a bimodal distribution is thus produced.

The quantity of the particles present in the non-agglomerated state after the agglomeration process is generally more than 50, preferably from 75 to 95%, of the particles (numeric distribution). The resultant partially agglomerated rubber latex is relatively stable, and can therefore readily be stored and transported without coagulation.

Another possibility for achieving a bimodal particle size distribution of the graft polymer B is to produce two different graft polymers B' and B", which have differing average particle sizes, separately from one another in a conventional manner, and to combine the graft polymers B' and B" in the desired quantitative proportion.

The selection of the reaction conditions for the polymerization of the graft base B1 is usually such as to give a graft base with a certain state of crosslinking.

Examples that may be mentioned of parameters essential for this purpose are the reaction temperature and reaction time, the ratio of monomers, regulator, free-radical initiator, and by way of example in the feed process the feed rate and the quantity, and juncture of addition, of regulator and initiator.

One method for characterizing the state of crosslinking of crosslinked polymer particles is the measurement of the swelling index SI, which is a measure of the swellability by a solvent, of a polymer which may have various degrees of crosslinking. A usual swelling agent is by way of example methyl ethyl ketone or toluene. The SI of the ungrafted molding compositions C1 of the invention is usually in the range from 10 to 60, preferably from 15 to 55, and particularly preferably from 20 to 50, in toluene.

Another method for characterizing crosslinking state is the measurement of NMR relaxation times of the mobile protons, these being known as T2 times. As the extent of crosslinking of a particular network increases, its T2 times decrease. Usual average T2 times for the graft bases B1 of the invention are in the range from 2.0 to 4.5 ms, preferably from 2.5 to 4.0 ms, and particularly preferably from 2.5 to 3.8 ms, measured on filmed samples at 80° C.

Another measure for characterizing the graft base and the state of crosslinking thereof is the gel content, i.e. the proportion of product that is crosslinked and is therefore insoluble in a particular solvent. It is advisable to use the same solvent for determining the gel content and for determining the swelling index. Usual gel contents of the graft bases B1 of the invention are in the range from 50 to 90%, preferably from 55 to 85%, and particularly preferably from 60 to 80%.

The swelling index is determined by way of example by the following method: about 0.2 g of the solid of a graft base dispersion filmed via evaporation of the water are swollen in a sufficiently large quantity of toluene (e.g. 50 g). After by way of example 24 h, the toluene is removed by suction and the sample is weighed. The sample is dried in vacuo and then again weighed. The swelling index is the ratio of the weight after the swelling procedure to the dry weight after the final drying process. The gel content is calculated correspondingly from the ratio of the dry weight after the swelling step to the ingoing weight for the swelling step (×100%).

The T2 time is determined via measurement of the NMR relaxation of a dewatered and filmed sample of the graft base dispersion. For this, by way of example, the sample is air-dried overnight and then by way of example dried in vacuo for 3 h at 60° C., and then subjected to measurement in suitable measuring equipment (e.g. Minispec equipment from Bruker) at 80° C. Comparison is possible only between samples subjected to measurement by the same method, since relaxation is distinctly temperature-dependent.

The conditions for the production of the graft B2 can be the same as those for the production of the graft base B1, and the graft B2 can be produced here in one or more steps. By way of example, in a two-stage grafting reaction it is possible to begin by polymerizing styrene and, respectively, α-methylstyrene alone, and then to polymerize styrene and acrylonitrile in two successive steps. This two-stage grafting reaction (first styrene, then styrene/acrylonitrile) is a preferred embodiment. Further details of the production of the graft polymers B are described in DE 12 60 135 and DE 31 49 358.

It is advantageous in turn to carry out the graft polymerization reaction onto the graft base B1 in aqueous emulsion. The system in which it is carried out can be the same as that for the polymerization of the graft base, and further emulsifier and initiator can be added here. These do not have to be the same as the emulsifiers and, respectively, initiators used for the production of the graft base B1: by way of example it can be advantageous to use a persulfate as initiator for the production of the graft base B1 but to use a redox initiator system for the polymerization of the graft shell B2. The statements made in relation to the production of the graft base B1 are valid for the selection of emulsifier, initiator, and polymerization aids.

The monomer mixture to be applied by grafting can be added to the reaction mixture all at once, batchwise in a plurality of stages, or preferably continuously during the polymerization reaction.

To the extent that ungrafted polymers are produced from the monomers B2 during the grafting of the graft base B1, the quantities, which are generally below 10% by weight of B2, are counted with the mass of component B.

The graft copolymers B of the invention can be used further in the form in which they arise in the reaction mixture, for example in the form of latex emulsion or of latex dispersion. Alternatively, and preferably for most applications, they can however also be worked up in a further step. Work-up measures are known to the person skilled in the art.

Among these are by way of example that the graft copolymers B are isolated from the reaction mixture, e.g. via spray drying, or shear, or via precipitation with strong acids or by means of nucleating agents such as inorganic compounds, e.g. magnesium sulfate. However, in another possible work-up method for the graft copolymers B present in the reaction mixture they are entirely or to some extent dewatered. It is likewise possible to undertake the work-up by means of a combination of the measures mentioned.

The SI of the graft copolymers is usually in the range from 7 to 20, preferably from 8 to 15, and particularly preferably from 8 to 13.

The mixing of components A and B for the production of the molding composition can be achieved in any desired manner by any of the known methods. If said components have been produced by way of example via emulsion polymerization, it is possible to mix the resultant polymer dispersions with one another, and then to precipitate the polymers together, and to workup the polymer mixture. However, the blending of said components is preferably achieved in that the components are extruded, kneaded, or rolled together, where the components have, to the extent necessary, been isolated in advance from the solution or aqueous dispersion obtained during the polymerization reaction. The graft-copolymerization products B obtained in aqueous dispersion can also be dewatered only to some extent and mixed in the form of moist crumb with the hard matrix B, whereupon the full drying of the graft copolymers C then takes place during the mixing process.

Re Component C:

The thermoplastic molding compositions of the invention can comprise, as component C, a styrene-acrylonitrile copolymer. The amount of component C is generally from 0 to 45 parts by weight, from 0 to 40, often from 0 to 30 parts by weight, or for many applications from 1 to 20 parts by weight.

In principle, component C used can comprise any of the styrene-acrylonitrile copolymers known to the person skilled in the art and described in the literature, or a mixture of these, as long as the viscosity number VN of mixtures of these is less than or equal to 80 ml/g (measured in accordance with DIN EN ISO 1628-2 at 25° C. on a 0.5% by weight solution in dimethylformamide; this measurement method is also valid for all of the viscosity numbers VN mentioned hereinafter).

Preferred components C have the following structure:

From 71 to 81% by weight, preferably from 73 to 79, in particular from 75 to 77% by weight of styrene and from 29 to 19% by weight, preferably from 27 to 21, in particular from 25 to 23% by weight, of acrylonitrile, and also from 0 to 5% by weight, preferably from 0 to 4% by weight, in particular from 0 to 3% by weight, of other monomers, where each of the % by weight values is based on the weight of component C and these values give a total of 100% by weight.

Abovementioned other monomers that can be used are any of the copolymerizable monomers, for example p-methylstyrene, tert-butylstyrene, vinylnaphthalene, alkyl acrylates and/or alkyl methacrylates, for example those having $C_1$- to $C_8$-alkyl moieties, N-phenylmaleimide, or a mixture of these. However, component C is often a pure SAN matrix.

The copolymers of component C can be produced by known methods, in particular bulk polymerization.

Re Component D:

The molding compositions of the invention can comprise, as component D, alongside components A, B, and C, one or more various additional substances and, respectively additives which are typical of, and commonly used in, plastics mixtures.

Examples that may be mentioned of these additional substances and, respectively, additives are: dyes, pigments, colorants, antistatic agents, antioxidants, stabilizers to improve thermal stability, to raise hydrolysis resistance and chemicals resistance, agents to counteract decomposition by heat and in particular the lubricants that are advantageous for the production of moldings. These other additional substances can be metered into the mixture at any stage of the production process, but preferably at an early juncture, in order to utilize the stabilization effects (or other specific effects) of the additional substance at an early stage. Heat stabilizers and, respectively, oxidation retarders are usually metal halides (chlorides, bromides, iodides) which derive from metals of group I of the Periodic Table of the Elements (for example Li, Na, K, Cu).

Stabilizers suitable as component D are the usual hindered phenols, but also "vitamin E" and compounds of analogous structure. Other suitable compounds are benzophenones, resorcinols, salicylates, benzotriazoles, and others. Quantities usually used of these are from 0 to 2% by weight, preferably from 0.01 to 2% by weight (based on the total weight of the molding compositions of the invention).

Suitable lubricants and mold-release agents are stearic acids, stearyl alcohol, stearic esters and, respectively, generally higher fatty acids, derivatives of these, and corresponding fatty acid mixtures having from 12 to 30 carbon atoms. The quantities of these additions—if they are present—are in the range from 0.05 to 1% by weight (based on the total weight of the molding compositions of the invention).

It is also possible to use silicone oils, oligomeric isobutylene, or similar substances as additional substances, and the usual quantities—if these are present—are from 0.05 to 5% by weight (based on the total weight of the molding compositions of the invention). It is likewise possible to use pigments, dyes, optical brighteners, such as ultramarine blue, phthalocyanines, titanium dioxide, cadmium sulfides, and derivatives of perylenetetracarboxylic acid.

Quantities usually used for processing aids, lubricants, and antistatic agents are from 0 to 2% by weight, preferably from 0.01 to 2% by weight (based on the total weight of the molding compositions of the invention).

Re Component E:

The molding compositions of the invention can comprise, as component E, fibrous or particulate fillers differing from the other components A to D, or a mixture of said fillers. These are preferably commercially available products, for example carbon fibers and glass fibers.

Glass fibers that can be used can be made of E, A, or C glass, and have preferably been equipped with a size and with a coupling agent. Their diameter is generally from 6 to 20 μm.

It is possible to use either continuous fibers or chopped glass fibers (staple), or what are known as rovings with a length of from 1 to 10 mm, preferably from 3 to 6 mm.

Other materials that can be also be added as component E are fillers or reinforcing materials, for example glass beads, mineral fibers, whiskers, aluminum oxide fibers, mica, quartz powder, and Wollastonite.

The molding compositions of the invention can in principle also comprise other polymers alongside components A, B, C, D, and E.

The molding compositions of the invention can be produced from the components in any desired manner by any of the known methods. However, it is preferable that the components are blended via mixing in the melts, for example by extruding, kneading, or rolling the components together, e.g. at temperatures in the range from 160 to 400° C., preferably from 180 to 280° C.

In one preferred embodiment, the components can have been isolated to some extent or entirely in advance from the reaction mixtures obtained during the respective production steps. By way of example, the graft copolymers C can be mixed in the form of moist crumb with pellets of the vinylaromatic copolymer B, whereupon then the full drying to give the graft copolymers described takes place during the mixing process.

It is possible to introduce the components in respectively pure form into suitable mixing apparatuses, in particular extruders, preferably twin-screw extruders. However, it is also possible to begin by premixing individual components, for example A and B, and then to mix these with further components B or C, or with other components, for example D and E. Component B here can be used in the form of component separately produced in advance. It is also possible to add the rubber and the vinylaromatic copolymer independently of one another.

In one embodiment a concentrate is first produced, for example from components D and E in component C (these being known as additive batches or masterbatches), and this is then mixed with the desired quantities of the remaining components. The molding compositions can be processed by the processes known to the person skilled in the art by way of example to give pellets, or else can be directly processed to give, for example, moldings.

The molding compositions of the invention can be processed to give foils, moldings, or fibers.

Said foils, moldings, or fibers are particularly suitable for use in the outdoor sector, i.e. with exposure to weathering. Said foils, moldings, or fibers can be produced by the known processes of thermoplastics processing from the molding compositions of the invention.

In particular, the production method can be thermoforming, extrusion, injection molding, calendering, blow molding, compression molding, pressure sintering or other types of sintering, preferably injection molding.

In comparison with the known stabilized molding compositions, the molding compositions of the invention exhibit a further improvement in weathering resistance, i.e. a further improvement in resistance to heat, light, and/or oxygen.

The following examples and claims provide further explanation of the invention.

Re the Test Methods:

The Yellowness Index (YI) was determined via determination of the color coordinates X, Y, Z in accordance with DIN 6167 using standard D 65 light and standard 10° observer.

Surface gloss was measured on all of the samples in accordance with DIN 67530 at an angle of observation of 60°.

The notched impact resistance of the products was determined at room temperature on ISO specimens in accordance with ISO 179 1eA.

Modulus of elasticity, yield stress, and tensile strain at break were determined in accordance with ISO 527 at 25° C.

The heat resistance of the specimens was determined by means of the Vicat softening point. The Vicat softening point was determined in accordance with the standard DIN ISO 306, with a force of 50 N and a temperature rise of 50 K per hour, on standard small specimens.

The composition of the styrene copolymers used was determined via quantitative IR spectroscopy.

Re the Starting Materials

Components or products preceded by "comp-" are non-inventive and serve for comparison.

The following were used as component A (and, respectively, comp-A for comparison):

A-i: An α-methylstyrene, styrene, acrylonitrile terpolymer with 60% by weight of α-methylstyrene, 14.7% by weight of styrene, and 25.4% by weight of acrylonitrile, and with a viscosity number of 49.1 (measured in 0.5% by weight DMF solution at 25° C.), Yellowness Index 18, and Vicat B softening point 120.1° C. $^{13}$C NMR analysis shows the following: 2.8% of α-methylstyrene/styrene triades (S-S-S) and 42.5% of α-methylstyrene/styrene diades (S-S).

A-ii: An α-methylstyrene, styrene, acrylonitrile terpolymer with 58.3% by weight of α-methylstyrene, 18.2% by weight of styrene, and 23.7% by weight of acrylonitrile, and with a viscosity number of 52.6 (measured in 0.5% by weight DMF solution at 25° C.), Yellowness Index 18, and Vicat B softening point 121.5° C. $^{13}$C NMR analysis shows the following: 4.3% of α-methylstyrene/styrene triades (S-S-S) and 51% of α-methylstyrene/styrene diades (S-S).

comp-A-iii: An α-methylstyrene, styrene, acrylonitrile terpolymer with 63.0% by weight of α-methylstyrene, 8.9% by weight of styrene, and 27.3% by weight of acrylonitrile and with a viscosity number of 53.3 (measured in 0.5% by weight DMF solution at 25° C.), Yellowness Index 47, and Vicat B softening point 118° C. This terpolymer is obtainable commercially from LG Chemical Co. Ltd® as 98 UHMBK. $^{13}$C NMR analysis shows the following: 2.1% of α-methylstyrene/styrene triades (S-S-S) and 29.2% of α-methylstyrene/styrene diades (S-S).

comp-A-iv: An α-methylstyrene, styrene, acrylonitrile terpolymer with 67% by weight of α-methylstyrene, 5% by weight of styrene, and 28% by weight of acrylonitrile and with a viscosity number of 58 (measured in 0.5% by weight DMF solution at 25° C.), Yellowness Index 28, and Vicat B softening point 112.5° C., as described in WO 2006/019214.

comp-A-v: An α-methylstyrene, styrene, acrylonitrile terpolymer was synthesized by analogy with EP 419 in aqueous dispersion. 780 g of acrylonitrile, 300 g of styrene, 1470 g of alpha-methylstyrene were added, with exclusion of air, to 6300 g of deionized water in which, at 75° C., 4.2 g of KOH and 60 g of potassium stearate had been dissolved. Once the reaction mixture had cooled to 50° C. with the aid of an oil bath, a redox initiator system consisting of 12.6 g of cumene hydroperoxide, 0.3 g of iron sulfate dissolved in 150 g of water, 15 g of sodium pyrophosphate in 18 g of dextrose, was dissolved in 450 g of water. 130 g of magnesium sulfate were used to precipitate the dispersion, the water was removed by centrifuging, and then the product was dried at 80° C. for 15 hours. This gave an α-methylstyrene, styrene, acrylonitrile terpolymer with Yellowness Index 21 and Vicat B softening point 106° C.

The following were used as component B (and, respectively, comp-B for comparison):

B-i: a butadiene graft rubber of which the synthesis is described as example A6 in DE 197 28 629 A1.

B-i$_1$ 41 826.4 g of butadiene and 1293.6 g of styrene are polymerized at 65° C. in the presence of 432 g of tert-dodecyl mercaptan (TDM), 311 g of potassium salt of $C_{12}$-$C_{20}$ fatty acids, 82 g of potassium persulfate, 147 g of sodium hydrogencarbonate, and 58 400 g of water to give a polybutadiene latex. The detailed procedure was as described in EP-A 62901, ex. 1, p. 9, line 20 to p. 10, line 6, but in a difference from that document the TDM was added in one portion at the beginning of the reaction. Conversion was 98%. The median particle size $d_{50}$ of the latex was 134 nm, and the swelling index was 20.3. The $T_2$ time determined by means of NMR was from 3.8 to 2.9 ms. For the agglomeration of the latex, 35 000 g of the resultant latex were agglomerated at 65° C. via addition of 2700 g of a dispersion (solids content 10% by weight) made of 96% by weight of ethyl acrylate and 4% by weight of methacrylamide.

B-i$_2$ 9000 g of water, 130 g of potassium salt of $C_{12}$-$C_{20}$-fatty acids, and 17 g of potassium peroxodisulfate were added to the agglomerated latex. 18 667 g of styrene and 4666 g of acrylonitrile were then added at 75° C. within 4 hours, with stirring. Conversion, based on the graft monomers, was almost quantitative. The resultant graft polymer dispersion had a bimodal particle size distribution. A first maximum of the particle size distribution was at 166 nm, and a second maximum was in the region of 442 nm.

An aqueous dispersion of an antioxidant was admixed with the resultant dispersion, which was then coagulated via addition of a magnesium sulfate solution. The coagulated rubber was isolated from the dispersion water by centrifuging and washed with water. This gave a rubber with about 30% by weight of adherent and included residual water. This gave a swelling index of 8.8 for C-i in toluene.

comp-B-ii: The production process was as for component C-i, but with 44 g of tert-dodecyl mercaptan (TDM) instead of 432 g of tert-dodecyl mercaptan (TDM). The $T_2$ time determined by means of NMR was from 3.5 to 2.5 ms. The swelling index after the grafting described in C-i$_2$ was 6.3 in toluene. Average particle size was determined as 316 nm.

The following were used as component C (and, respectively, comp-C for comparison):

C-i: A styrene-acrylonitrile copolymer with 75% by weight of styrene and 25% by weight of acrylonitrile, and viscosity number 98 (measured in 0.5% by weight DMF solution at 25° C.), Yellowness Index 2, and Vicat B softening point 103° C.

The following was used as component D:

D-i: a commercially available plasticizer: Hexamoll Dinch® (BASF SE, Germany).

The following was used as component E:

E-i: A commercially available glass fiber: 183F-11C (Cratec)

Production of the Molding Compositions and Moldings:

Components A, B, C, D (see table 1 for respective parts by weight) were homogenized in a twin-screw extruder (ZSK30 from Werner & Pfleiderer) at 250° C. and extruded into a water bath. The extrudants were pelletized and dried. From the pellets test samples were produced in an injection-molding machine at 250° C. melt temperature and 60° C. mold surface temperature, and the properties specified in table 1 were determined.

TABLE 1

Composition and properties of molding compositions (quantities in parts by weight: preceding comp means for comparison)

| Composition | 1 | 2 | 3 | 4 | 5 | 6 | comp-7 | comp-8 | comp-9 | comp-10 |
|---|---|---|---|---|---|---|---|---|---|---|
| A-i | 80 | | 60 | 70 | 70 | 75 | | 60 | | |
| A-ii | | 80 | | | | | | | | |
| comp-A-iii | | | | | | | 80 | | | |
| comp-A-iv | | | | | | | | | | 80 |
| comp-A-v | | | | | | | | | 80 | |
| B-i | 20 | 20 | 20 | 20 | 20 | 20 | 20 | 20 | 20 | 20 |
| comp-B-ii | | | | | | | | | | |
| C-i | | | 20 | | 10 | 5 | | 20 | | |
| E-i | | | | 10 | | 1 | | | | |
| Yellowness Index | 15 | 13 | 14 | 17 | 15 | 14 | 31 | 33 | 37 | 29 |
| Vicat B [° C.] | 117 | 117 | 112 | 115 | 112 | 111 | 109 | 109 | 104 | 108 |
| Gloss | 96 | 98 | 98 | 81 | 98 | 98 | 88 | 78 | 76 | 82 |
| Notched Charpy [kJ/m$^2$] | 11 | 10 | 13 | 8 | 10 | 12 | 9 | 5 | 5 | 7 |
| Modulus of elasticity [MPa] | 2799 | 2738 | 2527 | 4354 | 2627 | 2519 | 2672 | 2558 | 2487 | 2653 |
| Yield stress [MPa] | 58.8 | 58.2 | 57.3 | 79.3 | 56.2 | 59.3 | 53.2 | 56.9 | 48.7 | 53.8 |
| Tensile strain at break [%] | 8.5 | 7.4 | 8.6 | 3.3 | 8.2 | 8.9 | 7.4 | 8.3 | 5.8 | 7.2 |

In addition to the tests specified in table 1, a molding composition (7) was produced from:

79 parts by weight of A-i,
20 parts by weight of B-i, and
1 part by weight of D-i.

This molding composition (7) has the following properties:
Yellowness Index 16,
Vicat B 115° C.,
Gloss 97,
Notched Charpy 12 [kJ/m$^2$],
Modulus of elasticity 2712,
Yield stress 56.6 [MPa], and
Tensile strain at break 8.0 [%].

The examples confirm that, in numerous experiments, the molding compositions 1 to 7 of the invention comprising at least components A and B (and also component C in a number of cases) exhibit, in comparison with the known stabilized molding compositions, reduced yellowing (Yellowness Index YI) and increased heat resistance.

The respective compositions are stated in proportions by weight.

What is claimed is:

1. A thermoplastic molding composition comprising:
   a) from 50 to 85 parts of a terpolymer based on acrylonitrile, alpha-methylstyrene, and styrene (as component A) consisting of:
   from 12 to 20% by weight of styrene,
   from 22 to 27% by weight of acrylonitrile,
   from 57 to 62% by weight of alpha-methylstyrene,
   from 0 to 3% by weight of other copolymerizable monomers,
   b) from 15 to 50 parts of one or more impact-modifying graft rubbers having an olefinic double bond in the rubber phase, as component B,
   c) from 0 to 30 parts of one or more copolymers based on styrene and acrylonitrile, as component C, consisting of
   from 71 to 81% by weight of styrene,
   from 29 to 19% by weight of acrylonitrile,
   from 0 to 5% by weight of other copolymerizable monomers,
   d) from 0 to 30 parts of one or more additional substances differing from components A, B, C, as component D, and
   e) from 0 to 100 parts of fibrous or particulate fillers as component E.

2. The thermoplastic molding composition as claimed in claim 1, comprising:
   a) from 50 to 85 parts of a terpolymer based on acrylonitrile, alpha-methylstyrene and styrene (as component A) consisting of:
   from 12 to 20% by weight of styrene,
   from 22 to 27% by weight of acrylonitrile,
   from 57 to 62% by weight of alpha-methylstyrene,
   b) from 15 to 50 parts of one or more impact-modifying graft rubbers having an olefinic double bond in the rubber phase, as component B,
   c) from 0 to 30 parts of a copolymer based on styrene and acrylonitrile, as component C, consisting of
   from 71 to 81% by weight of styrene,
   from 29 to 19% by weight of acrylonitrile,
   d) from 0 to 10 parts of one or more additional substances differing from components A, B, C, as component D, and
   e) from 0 to 40 parts of fibrous or particulate fillers as component E.

3. The thermoplastic molding composition as claimed in claim 1, comprising from 50 to 85 parts of a terpolymer based on acrylonitrile, alpha-methylstyrene, and styrene (as component A), where the total residual contents of monomers in the terpolymer are less than 3000 ppm.

4. The thermoplastic molding composition as claimed in claim 1, comprising from 50 to 85 parts of a terpolymer based on acrylonitrile, alpha-methylstyrene, and styrene (as component A), where the residual contents of monomers in the terpolymer are less than 200 ppm of styrene, less than 200 ppm of ethylbenzene, less than 200 ppm of acrylonitrile, and less than 2000 ppm of alpha-methylstyrene.

5. The thermoplastic molding composition as claimed in claim 1, comprising from 50 to 85 parts of a terpolymer based on acrylonitrile, alpha-methylstyrene, and styrene (as component A), which has the following properties:
   a) Vicat B softening point above 120° C., (in accordance with DIN ISO 306)
   b) Yellowness Index below 20, (determination of color coordinates X, Y, Z in accordance with DIN 6167 using D65 standard light with 10° standard observer); and
   c) viscosity number from 40 to 60 (measured in accordance with DIN ISO 1628-2 at 25° on a 0.5 percent solution in dimethylformamide).

6. The thermoplastic molding composition as claimed in claim 1, characterized in that component B is an impact-modifying graft rubber which consists of a graft B1 made of from 50 to 80% by weight (based on B) of an elastomer-crosslinked butadiene polymer B1, and also of a graft B2 consisting of:
   a) from 25 to 15% by weight of acrylonitrile and
   b) from 75 to 85% by weight of styrene and/or alpha-methylstyrene.

7. The thermoplastic molding composition as claimed in claim 1, characterized in that the average particle diameter of component B is from 50 to 800 nm.

8. The thermoplastic molding composition as claimed in claim 1, characterized in that the swelling index (in toluene) of component B is from 7 to 20, where the swelling index states the ratio by weight of the weight after the swelling procedure in toluene to the weight before the swelling procedure, where 0.2 g of the solid from a graft base dispersion filmed via evaporation of the water is swollen in 50 g of toluene and the toluene is removed by suction after 24 hours.

9. The thermoplastic molding composition as claimed in claim 1, characterized in that a component B with a bimodal particle size distribution is used.

10. The thermoplastic molding composition as claimed in claim 1, characterized in that component C used comprises from 1 to 30 parts of a copolymer based on styrene and acrylonitrile, consisting of from 75 to 77% by weight of styrene and from 25 to 23% by weight of acrylonitrile.

11. A process for the production of a thermoplastic molding composition as claimed in claim 1, characterized in that components A and B, and also optionally C to E, are mixed with one another in any desired sequence at temperatures of from 100 to 300° C. and at a pressure of from 1 to 50 bar, and then are kneaded and extruded.

12. A process for the production of a terpolymer based on acrylonitrile, alpha-methylstyrene, and styrene (component A) consisting of from 12 to 20% by weight of styrene, from 22 to 27% by weight of acrylonitrile, from 57 to 62% by weight of alpha-methylstyrene, and also from 0 to 3% by weight of other copolymerizable monomers, characterized in that the monomers are reacted in a free-radical solution polymerization reaction at temperatures of from 100 to 140° C. and then the residual monomer content is reduced to less than 3000 ppm in a tube-bundle reactor at a pressure of less than 50 mbar.

13. A process for the production of at least one of moldings, foils, or fibers comprising the thermoplastic molding composition as claimed in claim 1.

14. The process for the production of at least one of moldings, foils, or fibers as claimed in claim 13, wherein the at least one molding, foil, or fiber includes at least one of a motor-vehicle component or an electronic equipment part.

15. A molding, fiber, or foil made of a thermoplastic molding composition as claimed in claim 1.

16. The thermoplastic molding composition as claimed in claim 6, characterized in that the graft B2 consists of:
   a) from 24 to 16% by weight of acrylonitrile and
   b) from 76 to 84% by weight of styrene and/or alpha-methylstyrene.

17. The thermoplastic molding composition as claimed in claim 6, characterized in that the graft B2 consists of:
   a) from 23 to 17% by weight of acrylonitrile and
   b) from 77 to 83% by weight of styrene and/or alpha-methylstyrene.

* * * * *